United States Patent
Stephenson

(12) 
(10) Patent No.: US 6,539,162 B1
(45) Date of Patent: Mar. 25, 2003

(54) PHOTOGRAPHING A PANORAMIC IMAGE PRODUCED FROM A CAPTURED DIGITAL IMAGE

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/281,677

(22) Filed: Mar. 30, 1999

(51) Int. Cl.⁷ .................................................. H04N 5/76
(52) U.S. Cl. .......................... 386/46; 386/128; 348/36; 348/39
(58) Field of Search .................. 348/36–39, 146, 348/167–168; 386/1, 46, 128–130; H04N 5/76, 5/92, 7/00, 9/79

(56) References Cited

U.S. PATENT DOCUMENTS

| | | | |
|---|---|---|---|
| 3,938,164 A | * 2/1976 | Ohnishi et al. | ............. 386/130 |
| 4,739,521 A | * 4/1988 | Akimoto | ..................... 386/130 |
| 5,453,842 A | * 9/1995 | Owen | ......................... 386/130 |
| 5,650,813 A | 7/1997 | Gilblom et al. | |
| 5,657,073 A | 8/1997 | Henley | |
| 5,752,113 A | 5/1998 | Borden | |
| 6,165,705 A | * 12/2000 | Dankosh et al. | ............ 430/619 |

OTHER PUBLICATIONS

T. R. Halfhill, See You Around, Byte Magazine, May 1995, pp. 85–90.

* cited by examiner

Primary Examiner—Thai Tran
(74) Attorney, Agent, or Firm—Raymond L. Owens

(57) ABSTRACT

Apparatus for processing a stored panoramic digital image includes a panoramic digital imager adapted to capture a predetermined panoramic digital image of a scene and a storage arrangement coupled to the panoramic digital imaging apparatus for storing a panoramic digital image. A display is coupled to the storage apparatus for displaying the stored panoramic digital image; and the apparatus receives a camera having photographic film including an optic for focusing the panoramic image on the display onto silver halide film in the camera.

4 Claims, 4 Drawing Sheets

PHOTOGRAPHING A PANORAMIC IMAGE PRODUCED FROM A CAPTURED DIGITAL IMAGE

FIELD OF THE INVENTION

The present invention relates to capturing digital images which can be used to form panoramic images.

BACKGROUND OF THE INVENTION

A variety of composing and display systems have been commercialized to create and view panoramic images. In Byte magazine, May 1995 issue, an article "See You Around" on page 85–90 describes software programs operating on digitally stored files having a panoramic view. The systems create a immersive image with a 360 degree field of view by knitting together overlapping images or from a single 360 degree field of view image. Another system from IPIX Corporation uses a photographic camera to capture two complementary 180 degree views with a fish-eye lens. An IPIX computer program knits digital data from the two 180 degree views and corrects for optical distortion from the fish-eye lens to generate a digital 360 degree panoramic view.

U.S. Pat. No. 5,752,113 discloses a mount for an image capture device with sequentially indexed motion through 360 degrees of rotation. The frame can hold either a silver halide or electronic cameras. U.S. Pat. No. 5,650,813 discloses a rotating optical system that scans a panoramic view onto an electronic sensor. U.S. Pat. No. 5,657,073 discloses a set of cameras facing in various directions. The image data from the cameras is transformed to remove distortion in the over lapping images and creates a panoramic scene. Control circuitry selects a portion of the panoramic images through a display device having separate image streams to each of the viewer's eyes.

The prior art requires dedicated apparatus to capturing a panoramic image.

SUMMARY OF THE INVENTION

It is an object of the present invention to capture a panoramic image with a camera not equipped with a panoramic capture feature.

This object is achieved by apparatus for processing a stored panoramic digital image comprising:

(a) panoramic digital imaging means being adapted to capture a predetermined panoramic digital image of a scene, (b) storage means coupled to the panoramic digital imaging means for storing a panoramic digital image;

(c) display means coupled to the storage means for displaying the stored panoramic digital image; and (d) means for receiving a camera having photographic film including optic means for focusing the panoramic image on the display onto silver halide film in the camera.

The present invention provides an effective way of capturing panoramic images by a photographic camera using silver halide film which does not have a panoramic feature. A further advantage is that full 360 degree panoramic images can be captured on the silver halide film when using a conventional camera.

DETAILED DESCRIPTION OF THE INVENTION

Figure 1:
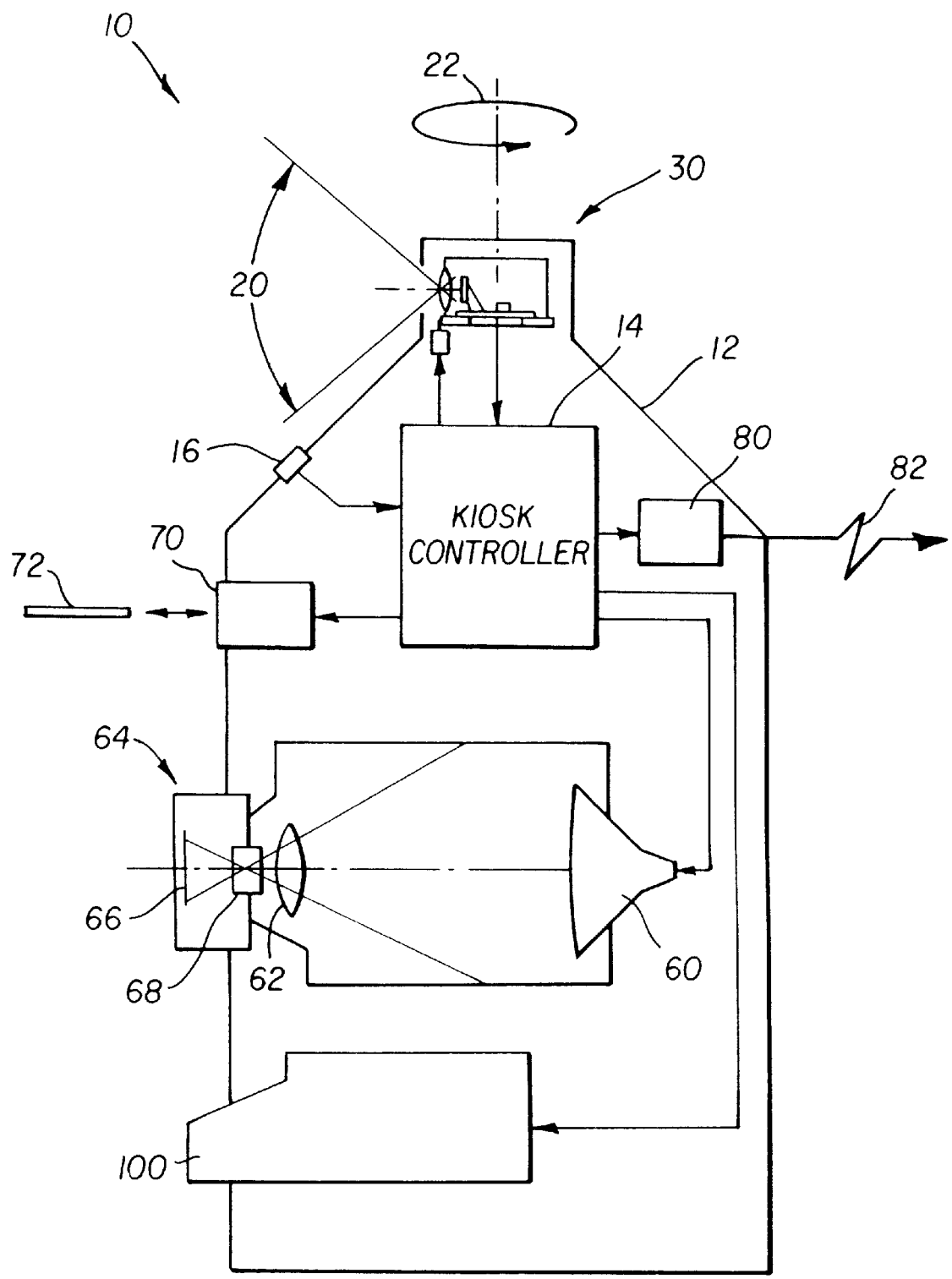
FIG. 1 is a side sectional view of a panoramic kiosk in accordance with the present invention.

In FIG. 1 there is shown a kiosk 10 that generates panoramic images. The present invention is described in relation to a kiosk 10 although it can be used in other environments. Kiosk 10 has kiosk enclosure 12 which contains kiosk controller 14 to control operation of kiosk 10. On the top of kiosk 10 is an imager assembly 30 which captures panoramic digital images of a scene. Imager assembly 30 is configured to capture a vertical field of view 20 throughout a 360 degree horizontal field of view 22. In the exemplary embodiment, the generated image will be 1000 columns of 250 pixels around a 360 degree field of rotation. The imager assembly 30 will be described more fully in FIG. 2.

Figure 2:
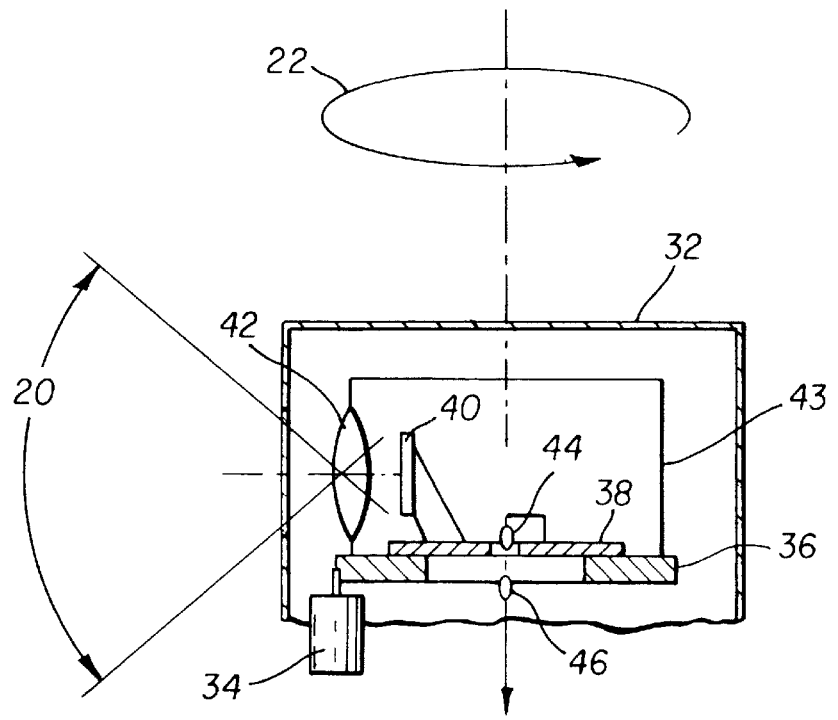
FIG. 2 is a side sectional view of the imager assembly of the kiosk of FIG. 1.

FIG. 2 is an enlarged side view of imager assembly 30. Imager cover 32 forms an external cover of imager assembly 30. Imager cover 32 is a clear glass or plastic cover that provides environmental protection for imager assembly 30. An imager base 36 is supported to rotate freely around an axis defining horizontal field of view 22. Imager controller 38 rests on top of imager base 36 and is a circuit board supporting electronic components that generates electronic data representing a panoramic image which can be 360 degrees. Image controller 38 is connected to or supports a linear, vertically aligned linear imager 40.

Imager optic 42 is selected to provide vertical field of view 20. In the given embodiment with 1000 columns of square pixels around a 360 degree horizontal field of view 22, a 90 degree vertical field of view will have 250 pixels. Imager 40 can be a linear sensor array of 250 pixels 14 um square, having a 3.5 millimeters length. Each pixel in the array is covered by one of the sequential color filters providing sensitivity to one of the three primary colors red, green or blue. The nominal light integration time on the device is 150 microseconds, and requires 50 microseconds to clock data from the device. For the given embodiment, imager optic 42 should have an effective focal length of 3.5 millimeters. Imager optic 42 is aligned and affixed to imager 40, and both parts are shielded from stray light by imager light cover 43.

Figure 3:
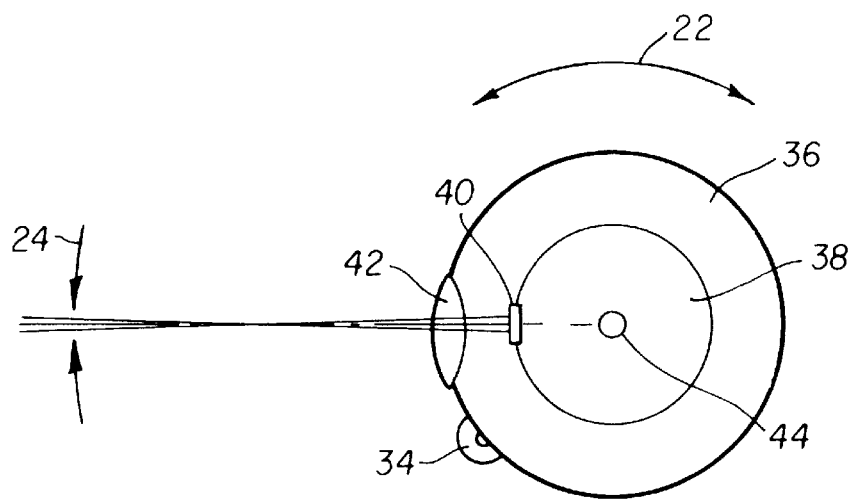
FIG. 3 is a top view of the imager assembly of shown in FIG. 2.

In FIG. 3, a partial top view is shown of imager assembly 30 is shown. Rotating imager assembly 30 through 1000 positions around a 360 field of coverage requires an 0.36 degree horizontal field coverage 24. For example, imager 40 can have 14 micron pixels, and imager optic 42 can have a focal length of 3.5 millimeters. In the given embodiment, horizontal field coverage 24 will be 0.22 degrees which is adequate to delineate each column of pixel data.

Figure 4:
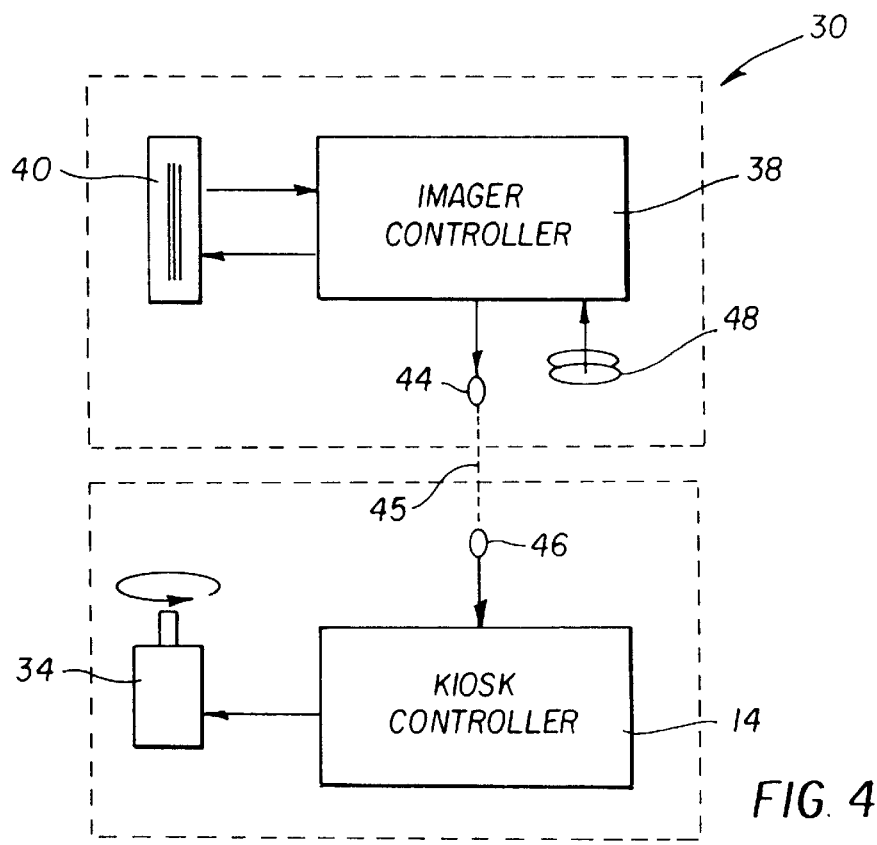
FIG. 4 is an electronic block diagram in accordance with the present invention showing panoramic image capture and is also a top view of an imager assembly according to another embodiment of the invention.

FIG. 4 is an schematic diagram of the interface between imager assembly and the rest of kiosk 10. Imager base 36 is spun by spin motor 34 under control of kiosk controller 14. For the given embodiment, imager 40 dwells 200 microseconds at each of 1000 column position per rotation. Kiosk controller 14 drives spin motor 34 at 5.000 revolutions per second within 0.1% flutter to accurately space columns of image data from imager 40.

As imager base 36 is spun, imager controller 38 continuously captures image data from imager 40. Data captured by imager 40 is operated on by imager controller 38 and used to drive image transmitter 44. Image transmitter 44 can be a conventional LED mounted on image controller 38 coaxial with the axis of rotation of imager base 36. Alignment of image transmitter 44 and image receiver 46 creates optical coupling 45 to permit passage of data from the rotating components of imager assembly 30 and kiosk controller 14.

Data corresponding to a panoramic image are transmitted as a binary data stream. The sensed value of each pixel is converted to an eight bits of data representing a color intensity for each pixel. Imager 40 integrates impinging light for 150 microseconds, then the data for the 250 pixels are transferred out of imager 40, through image controller 38 and out through image transmitter 44.

Every 4000 bits represents one column of a panoramic image. Imager 40 is reset and the process is repeated. Integration and transfer rate time from imager 40 have been set to create a 20 megahertz data rate through optical coupling 45. Kiosk controller 14 detects the transmission rate and controls the speed of spin motor 34 to synchronize with the data transmission rate from imager assembly 30.

Power to imager assembly 30 is provided by an inductive power coil 48 that responds to a magnetic field formed at the interface between imager assembly 30 and the rest of kiosk 30. A permanent magnetic or a second electromagnetic coil can be used to transfer power into the rotating part of imager assembly 30.

Image receiver 46 is connected to controller 14, which uses data received from imager assembly 30 from optical coupling 45 to create a 360 degree panoramic image. Data representing red, green and blue color intensity is found for each pixel by interpolating missing color data using adjacent color data for a each color plane.

Figure 5:
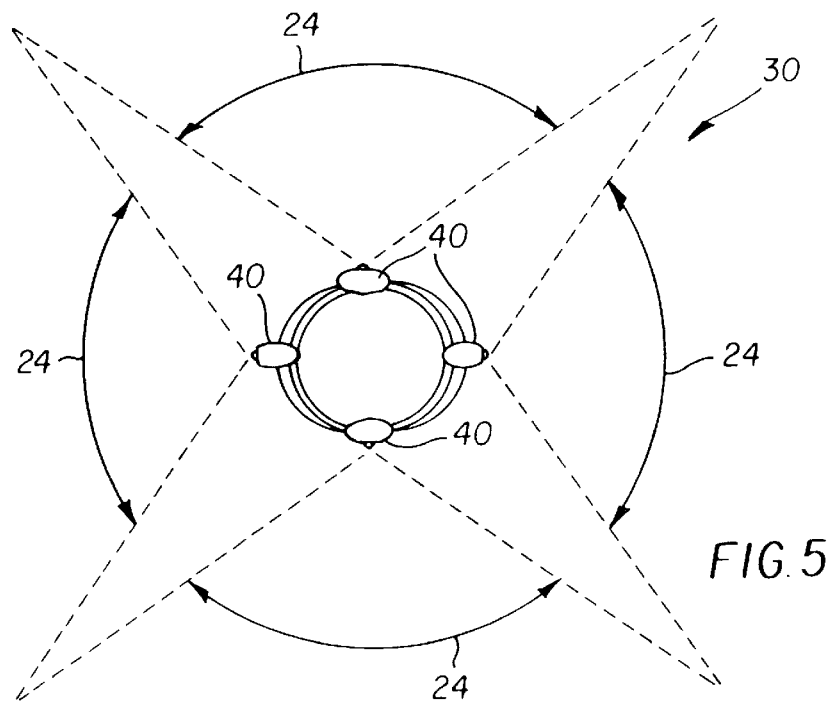
FIG. 5 is front view of a monitor supporting a panoramic field of view.

FIG. 5 is an alternative embodiment having a set of individual cameras fixedly mounted to the top of kiosk 10 to create imager assembly 30. Each of four imagers 40 is of conventional design and has a 3:4 aspect ratio corresponding conventional video sensor aspect ratio. Image sensor 24 is an integrated circuit having 800 rows and 1200 columns of 8 micron square sensing elements. Each optic 22 is a set of lenses with an effective focal length of 5 millimeters. The size of image sensor 24 and the focal length of optics 22 provide the 92 degree horizontal field of view and the 60 degree vertical field of view of digital cameras 20. The images from the four imagers 40 are combined to generate a 360 degree panoramic image 800 pixels in height and 4800 pixels in depth.

A user initiates a panoramic capture by activating control 16 on kiosk 10. Control 16 can be a simple push button that signals kiosk controller 14 to capture an image from imager assembly 30. A time delay for image composition can be built into kiosk controller 14 to provide a time interval between pressing control 16 and image capture.

Figure 6:
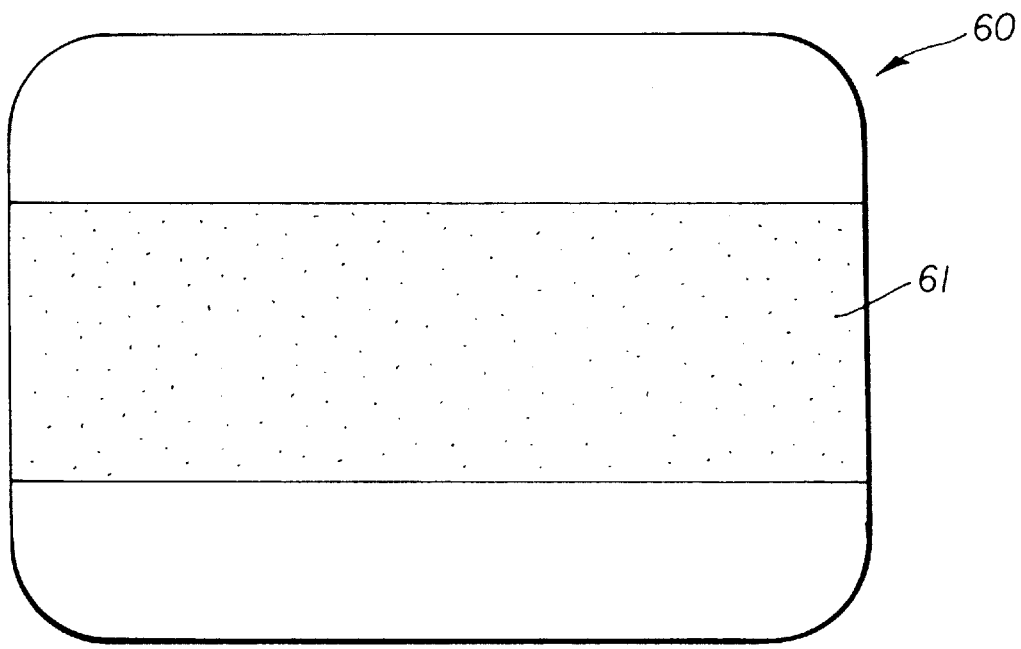
FIG. 6 is a front view of a conventional film frame supporting a panoramic field.

After a panoramic image is captured, kiosk controller 14 can generate a copy of the captured 360 degree panoramic image. A display 60 can be integral with kiosk 10 to permit a user to view the generated 360 degree panoramic image. Display 60 can be a cathode ray tube or a liquid crystal display of conventional design. FIG. 6 shows display 60 having a display panoramic image 61. Display panoramic image 61 has a 360 degree field of view across the monitor and a height of image corresponding to vertical field of view 20. Alternatively, display 60 can be a window into an immersive portion of the 360 degree panoramic image, such as is available on Apple QuickTime VR.

Kiosk enclosure 12 can be configured to hold camera 64 in relationship to display 60. Camera optic 68 is often fixed focused at a focal distance of between 10 and 20 feet. A correction diopter 62 equivalent to the distance between camera 64 and display 60 will make display 60 appear to be at the focal point of camera optic 68. With correction diopter 62, an image on display 60 will appear focused onto film 66 and permit the distance between camera 64 and display 60 to fit within kiosk 10. Using this arrangement, a user can insert camera 64 into kiosk 10 and photograph a 360 degree panoramic image onto conventional film 66.

Figure 7:
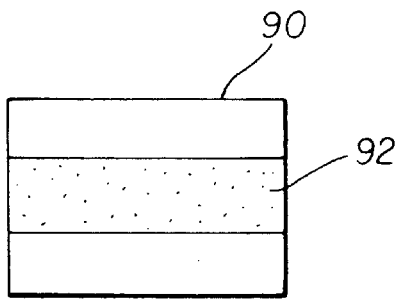
FIG. 7 is a front view showing images on a display as they would appear on film.

FIG. 7 is a front view showing how the image on display 60 would appear on film 66. Image frame 90 is the nominal frame size 36 by 24 millimeter image for a 135 format film. Panoramic image area 92 within image frame 90 is an area that is conventionally used for what is known as panoramic images. Such image can incorporate a 140 degree vertical field of view 20. Because the scene has been digitally captured and presented to camera 64 as a full 360 degree image, conventional cameras can capture a full 360 degree panoramic image on film 66. Previously, special or dedicated cameras, or multiple stitched images were required to create 360 degree image. With the present invention, such images area captured with conventional, unmodified cameras 64.

Kiosk 10 further incorporates a digital media writer 70. Users with digital cameras using digital storage media can insert digital media 72 into digital media writer 70 to receive a copy of a captured 360 panoramic image. Digital media 72 can be a removable semiconductor memory element conforming to current standards such as a CompactFlash™ card, a SmartMedia™ card or a PCMCIA memory card™. Alternatively, digital media 72 can be a magnetic or optical recording drive conforming to a standard format. In the case of a recording medium, digital media 72 can also be a writable Compact Disk™ or digital magnetic tape.

Kiosk 10 can further incorporate transmission device 80 for transmission of 360 degree panoramic images to a device that can receive panoramic images. Alternatively data transceiver 80, such as a modem, can receive requests for panoramic image, which are processed by controller 14. Controller 14 can operate in response to such requests and transmit 360 degree panoramic images that have been stored or capture a new image for transmission.

Kiosk 10 incorporates a printer 100 for printing out digital 360 panoramic images stored in controller 14. Using control 16, a user can initiate a printing of a current or previously captured 360 degree panoramic image. Using an immersive frame controller, such as Apple QuickTime VR, an operator can use display 60 to select portions of a stored 360 degree using display 60. After formatting, a user uses control 16 to print the formatted image using printer 100.

The invention has been described in detail with particular reference to certain preferred embodiments thereof, but it will be understood that variations and modifications can be effected within the spirit and scope of the invention.

Parts List 10 kiosk
12 kiosk enclosure 14 kiosk controller
16 control
20 vertical field of view
22 horizontal field of view
24 horizontal field coverage
30 imager assembly
32 imager cover
34 spin motor
36 imager base
38 imager controller
40 imager
42 imager optic
43 imager light cover
44 image transmitter
45 optical coupling
46 image receiver
48 inductive power coil
60 display
61 display panoramic image
62 correction diopter
64 camera
66 film
68 camera optic
70 digital media writer
72 digital media
80 transceiver
82 digital image transmission
90 image frame
92 panoramic image area
100 printer

What is claimed is:

1. Apparatus for processing a stored panoramic digital image comprising:

(a.) panoramic digital imaging means being adapted to capture a predetermined panoramic digital image of a scene, (b) storage means coupled to the panoramic digital imaging means for storing a panoramic digital image;

(c.) display means coupled to the storage means for displaying the stored panoramic digital image; and (d.) means for receiving a camera having photographic film including optic means for focusing the panoramic image on the display onto silver halide film in the camera.

2. The apparatus of claim 1 wherein the panoramic digital means includes a plurality of digital cameras and positioned to have overlapping fields of view.

3. The apparatus of claim 1 further including means for receiving a memory device and for transferring panoramic digital images to the storage device.

4. The apparatus of claim 1 further including means for transmitting over a communication channel the stored panoramic digital image to an external device.

* * * * *